(12) United States Patent
Soliman et al.

(10) Patent No.: US 8,147,373 B2
(45) Date of Patent: Apr. 3, 2012

(54) CONTROL OF A DRY, DUAL-CLUTCH TRANSMISSION DURING AN ENGINE RESTART OF A HYBRID ELECTRIC VEHICLE

(75) Inventors: Ihab S. Soliman, Canton, MI (US);
Ryan A. McGee, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 341 days.

(21) Appl. No.: 12/686,599

(22) Filed: Jan. 13, 2010

(65) Prior Publication Data

US 2010/0279818 A1    Nov. 4, 2010

Related U.S. Application Data

(63) Continuation-in-part of application No. 12/434,114, filed on May 1, 2009, now Pat. No. 8,062,171.

(51) Int. Cl.
*B60K 1/02* (2006.01)
(52) U.S. Cl. ............................................................ 477/3

(58) Field of Classification Search ... 477/3; 180/65.21, 180/65.24, 65.275, 307
See application file for complete search history.

(56) References Cited

U.S. PATENT DOCUMENTS

| 7,520,353 | B2 * | 4/2009 | Severinsky et al. ......... 180/65.28 |
| 7,972,239 | B2 * | 7/2011 | Imediegwu ....................... 477/2 |
| 2010/0304926 | A1 * | 12/2010 | Soliman et al. .................. 477/38 |
| 2011/0065548 | A1 * | 3/2011 | Yu et al. ......................... 477/203 |
| 2011/0070999 | A1 * | 3/2011 | Soliman et al. .................... 477/3 |

* cited by examiner

*Primary Examiner* — Dirk Wright
(74) *Attorney, Agent, or Firm* — David B. Kelly, Esq.; MacMillan, Sobanski & Todd, LLC (57) ABSTRACT

A method for controlling an engine restart in a hybrid electric powertrain, including the steps of stopping the engine, using an electric power source and an electro-mechanical actuator connected to the source to engage a gear and stroke to zero torque capacity a dry clutch of a dual-clutch transmission, initiating an automatic engine restart, and increasing the torque capacity of the clutch to a desired torque capacity during the engine restart.

18 Claims, 6 Drawing Sheets

CONTROL OF A DRY, DUAL-CLUTCH TRANSMISSION DURING AN ENGINE RESTART OF A HYBRID ELECTRIC VEHICLE

This application is a continuation-in-part of pending U.S. application Ser. No. 12/434,114, filed May 1, 2009.

BACKGROUND OF THE INVENTION

1. Field of the Invention

This invention relates generally to a powertrain for a hybrid electric vehicle (HEV) and, more particularly, to a powertrain with a dry dual-clutch automatic transmission and its control during an engine restart event.

2. Description of the Prior Art

A hybrid electric vehicle (HEV) is a vehicle configured with a hybrid propulsion system that utilizes at least two different sources of torque for propelling the vehicle. A hybrid propulsion system may combine a conventional propulsion system that includes an internal combustion engine and a stepped-ratio automatic transmission with an electric propulsion system that includes one or more electric motors and a rechargeable energy storage device, such as a battery, that can power the electric motors or store energy to improve fuel economy over the conventional vehicle. A hybrid electric vehicle typically provides different powertrain operating modes with the engine running or shutdown depending on the vehicle operating conditions, battery conditions, and driver's propulsion request. Hence, one of the major functions that an HEV provides is the ability to start or stop the engine during certain conditions. When the engine is running, the electric portion of the propulsion system may be used to assist the engine in providing the required vehicle propulsion. During the conditions when the engine is shutdown, the driver's propulsion request can be provided entirely by the electric motor.

Motor vehicles can be designed to employ certain aspects of hybrid electric technology to reduce fuel consumption, but without use of a hybrid drivetrain. In such vehicles, called "micro-HEVs", shutting down the engine during conditions where the engine operates at idle speed will be used to reduce fuel consumption and reduce emissions in a conventional powertrain that includes an internal combustion engine and a stepped-ratio automatic transmission, but no electric machine for driving the wheels. In a micro-HEV with an automatic transmission, the primary condition that is checked by the powertrain control system before stopping the engine is that the driver has applied the brakes and the vehicle is stopped since the engine would typically be idling during these conditions in a conventional vehicle. Once the driver releases the brake pedal indicating a request for vehicle propulsion, the powertrain control system will automatically restart the engine.

In a Micro-HEV application with a dry dual-clutch automatic transmission, coordinated transmission control before, during, and after an engine start is critical to acceptable vehicle performance. Specifically, the control of transmission clutch torque capacity during the engine start directly controls the amount of engine torque transferred to the wheels for vehicle propulsion. Moreover, any delays in clutch torque capacity application directly result in non-responsive vehicle propulsion and poor vehicle performance. Furthermore, in vehicle applications using a dual-clutch (powershift) automatic transmission without a torque converter, any excessive clutch torque capacity during an engine restart can lead to engine stall and/or rough creep and launch performance.

One method commonly applied to address these issues is simply keeping the transmission in a neutral state during engine shutdown and restarts. Once the engine is running, the transmission clutch torque can be increased so that torque is transmitted to the wheels. A problem with this approach is that poor vehicle response will be perceived by the driver since vehicle propulsion is not provided until the engine has been started and clutch torque capacity has been increased. In conventional and wet-clutch dual-clutch automatic transmission applications which are electro-hydraulically actuated through a pump mechanically driven by the engine, an electric auxiliary pump would be used to provide hydraulic pressure for any clutch actuation while the engine is not running.

A dry dual-clutch automatic transmission is an automatic transmission whose clutches' torque transmitting capacity varies in response to electro-mechanical actuation rather than by pressurized hydraulic fluid.

A strategy is needed to coordinate transmission and engine control during an engine start event while minimizing energy consumption in order to provide responsive, smooth, consistent and predictable vehicle propulsion performance.

SUMMARY OF THE INVENTION

A method for controlling an engine restart in a hybrid electric powertrain, including the steps of stopping the engine, using an electric power source and an electro-mechanical actuator connected to the source to engage a gear and control a dry clutch of a dual-clutch transmission to a touch point position with zero torque capacity, initiating an automatic engine restart, and increasing the torque capacity of the clutch to a desired torque capacity.

The invention contemplates also a powertrain that includes an engine, a dry dual-clutch automatic transmission including two clutches and first and second gears, an electro-mechanical actuator for actuating the clutches and engaging the gears, and a controller configured to stop the engine, engage a gear and control the first clutch to a touch point position with zero torque capacity using the electro-mechanical actuator, initiate an automatic engine restart, and increase the torque capacity of the clutch to a desired torque capacity.

The control method and system provide a substantially immediate response to a request for vehicle propulsion when the engine is restarted by taking advantage of the electro-mechanical actuation capabilities of a dry dual-clutch automatic transmission. The control strategy uses a vehicle system controller to coordinate engine and transmission control before, during, and after an engine start event. It produces smooth and responsive driveline propulsion performance.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
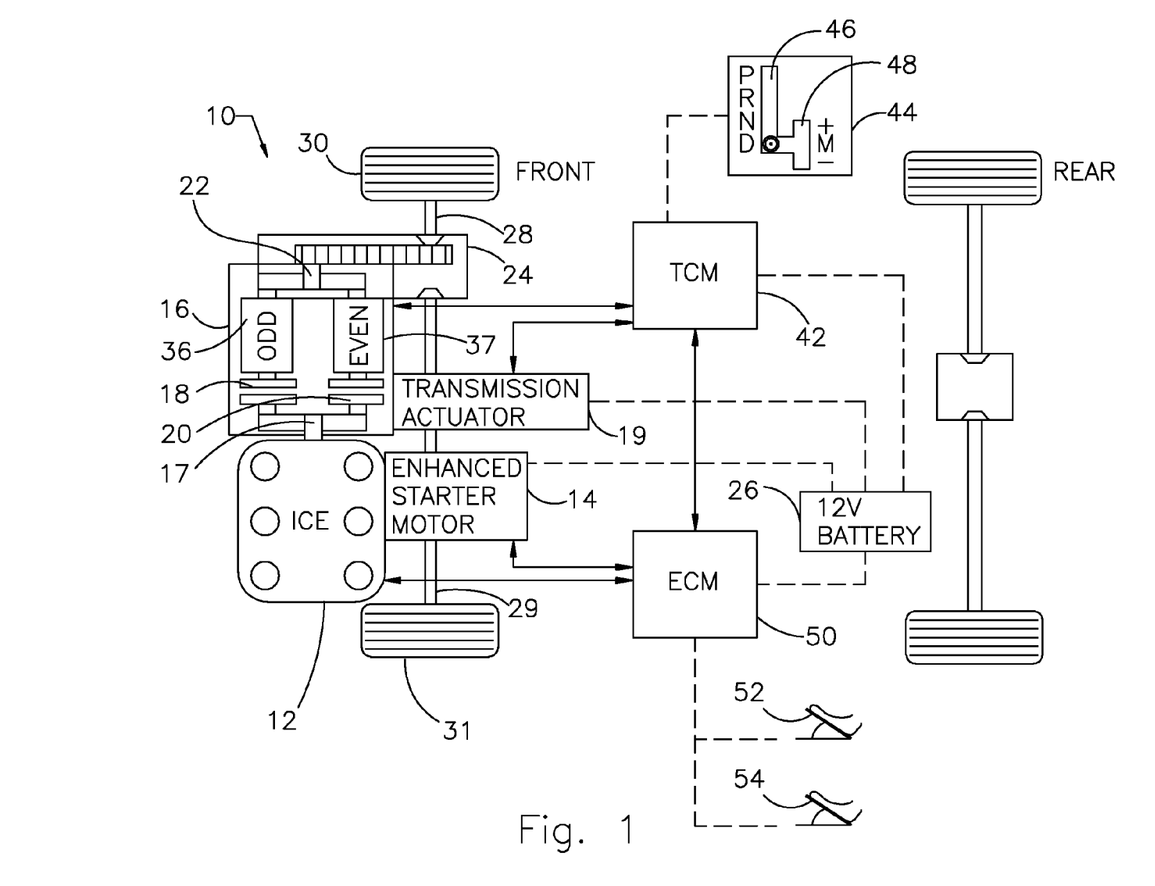
FIG. 1 is a schematic diagram of a micro-HEV powertrain.
Figure 2:
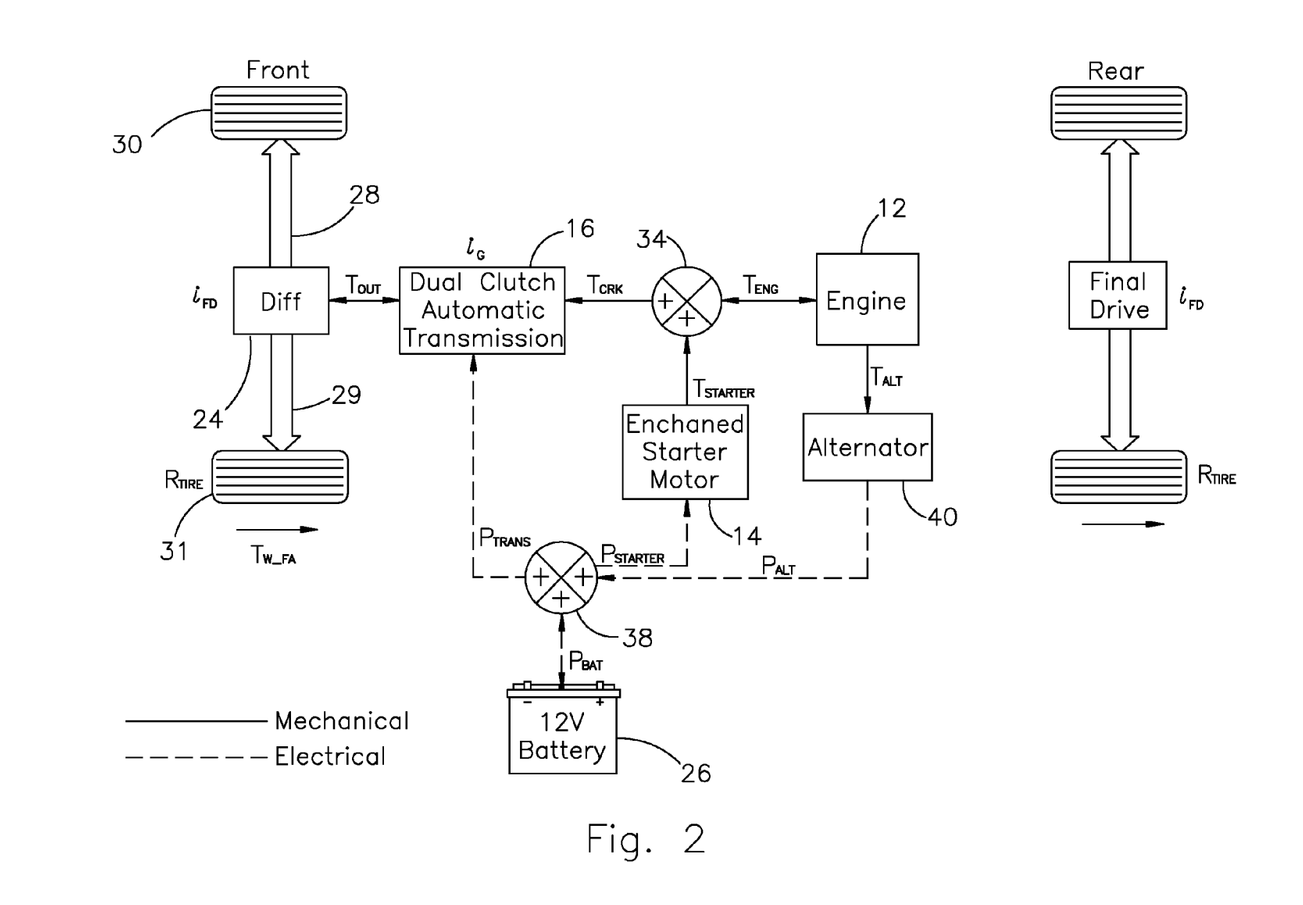
FIG. 2 is schematic diagram showing torque and electric power flow in the powertrain of FIG. 1.

Referring now to FIGS. 1 and 2, the micro-HEV powertrain 10 of FIG. 1 includes a power source 12, such as an internal combustion engine; an enhanced engine starter motor 14; a dual clutch automatic transmission 16, connected to the engine by an input shaft 17 and dry clutches 18, 20; an electro-mechanical actuator 19, which varies the torque transmitting capacity of the clutches and engages and disengages gears of first and second layshafts 36,37; a first layshaft 36 containing odd gears $1^{st}$, $3^{rd}$, $5^{th}$ and reverse gears; a second layshaft 37 containing even gears $2^{nd}$, $4^{th}$, and $6^{th}$ gears; a transmission output 22; final drive mechanism 24, connected to the output 22; an electric storage battery 26, which supplies electric power to the starter motor 14 and electro-mechanical actuator 19; and axle shafts 28, 29, driveably connect to the driven wheels 30, 31.

FIG. 2 shows that engine output torque $T_{ENG}$ and torque $T_{STARTER}$ produced by the enhanced starter motor 14 are combined at a junction 34 to produce a net engine crankshaft torque $T_{CRK}$. Transmission output torque $T_{OUT}$ is transmitted from the transmission 16 to the final drive mechanism 24, which includes an interwheel differential and is driveably connected to axle shafts 28, 29 and driven wheels 30, 31. Electric power $P_{BAT}$ from battery 26 and electric power $P_{ALT}$ produced by an alternator 40 is supplied to a junction 38, from which electric power $P_{STARTER}$ and $P_{TRANS}$ is transmitted to the starter motor 14 and to the electromechanical actuator 19 for controlling dry input clutches 18, 20 and gear engagements of layshafts 36,37 of transmission 16, respectively.

Referring to FIG. 1, a transmission control module (TCM) 42 and an engine control module ECM 50 communicates through electronic signals mutually and with battery 26, transmission 16, the electro-mechanical actuator 19 of clutches 18, 20, and a gear shifter 44, which moves among (P)ARK, (R)EVERSE, (N)EUTRAL, (D)RIVE positions in an automatic mode channel 46 and between upshift (+) and downshift (−) positions in a manual mode channel 48. The engine control module (ECM) 50 is powered by battery 26, receives and sends signals to the starter 14 and engine 12 and receives input signals from an accelerator pedal 52 and brake pedal 54. The engine control module (ECM) 50 also contains the vehicle system controller for coordinating overall powertrain control.

Figure 3:
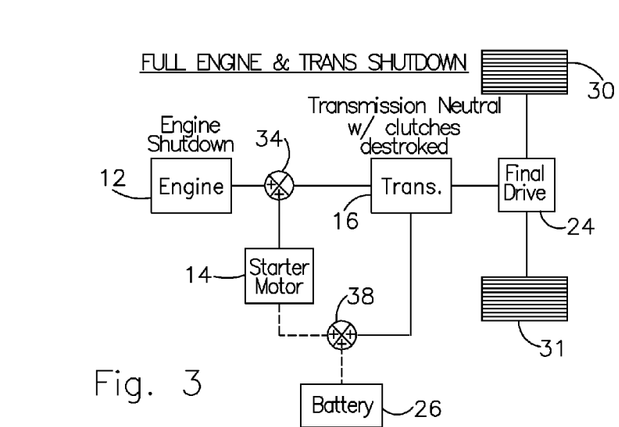
FIG. 3 is a schematic diagram showing the engine and transmission shutdown operating mode.

Referring now to FIGS. 3-6, during a first powertrain operating mode illustrated in FIG. 3, the engine 12 is initially shutdown and the transmission 16 is disengaged in a neutral state, i.e., the dry input clutches 18, 20, whose coordinated engagement and disengagement produce the various transmission gear ratios, are fully disengaged and destroked and transmission 16 produces no output torque. This operating mode is primarily used when the gear lever position is in PARK/NEUTRAL and while the engine is stopped with the ignition key off.

Figure 4:
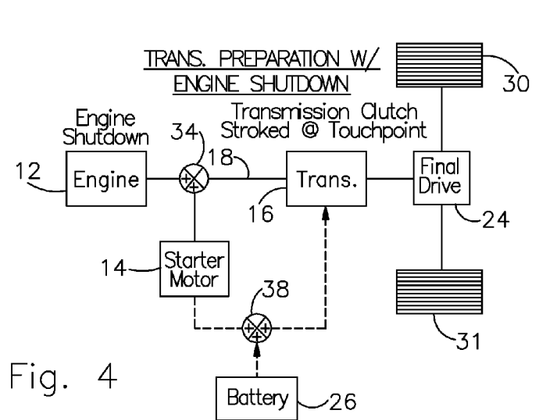
FIG. 4 is a schematic diagram showing power flow in the transmission preparation operating mode with the engine shutdown.

FIG. 4 illustrates a second powertrain operating mode of the control strategy, a standby mode while engine 16 is shutdown, during which the dry dual-clutch transmission 16 is prepared to transmit engine torque during the next engine restart. Transmission 16 is controlled to an "active neutral" state where the clutches 18, 20 are controlled to a touchpoint position with zero torque capacity but ready to transmit torque once clutch torque capacity is commanded. While transmission 16 is in this standby mode, it transmits no torque, but the oncoming clutch 18, 20 that corresponds to the gear in which the vehicle will be launched is stroked at the touchpoint with zero torque capacity. This is possible while engine 16 is shutdown since the dry-clutches 18, 20 are electro-mechanically actuated. The gearbox of transmission 16 is also engaged in the launch gear and in a preselected gear on the non-active layshaft.

Unlike the clutches of a conventional automatic transmission or a wet clutch, dual-clutch (i.e. powershift) transmission, which are electro-hydraulically actuated, the dry-clutch DCT can be engaged in any gear with full clutch actuation while the engine is not running since the clutches and gears are electro-mechanically controlled by electric motors. The vehicle system controller, comprising ECM 50, initiates this second powertrain operating mode after the gear lever 44 is shifted into a vehicle driving position (DRIVE, REVERSE, MANUAL, etc.) while the engine is stopped since vehicle propulsion is required upon an engine restart.

The second powertrain operating mode can also be used to improve engine restarts while the engine is shutdown and the vehicle is moving.

Figure 5:
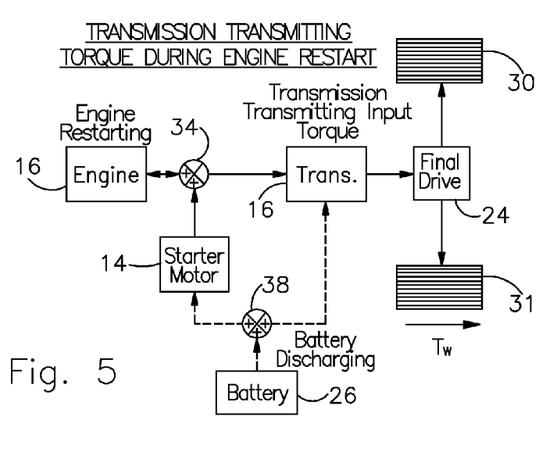
FIG. 5 is a schematic diagram showing power flow while the transmission is transmitting torque during the engine restart operating mode.

Once the vehicle system controller 50 determines that the engine 16 is to be automatically restarted, e.g. in response to the brake pedal 54 being released or the accelerator pedal 52 being depressed while the vehicle is stopped, the third powertrain operating mode shown in FIG. 5 is activated. In the third operating mode, responsive vehicle propulsion is provided during the engine restart by increasing torque capacity of the oncoming clutch 18, 20 that corresponds to the gear in which the vehicle will be launched. Preferably, the oncoming clutch 18, 20 is slipping and is never locked, i.e., full engaged, while increasing the torque capacity during this operating mode in order to prevent stalling the engine 16. By producing some torque capacity in the oncoming clutch 18, 20 during the engine restart, vehicle propulsion delays are minimized.

Figure 6:
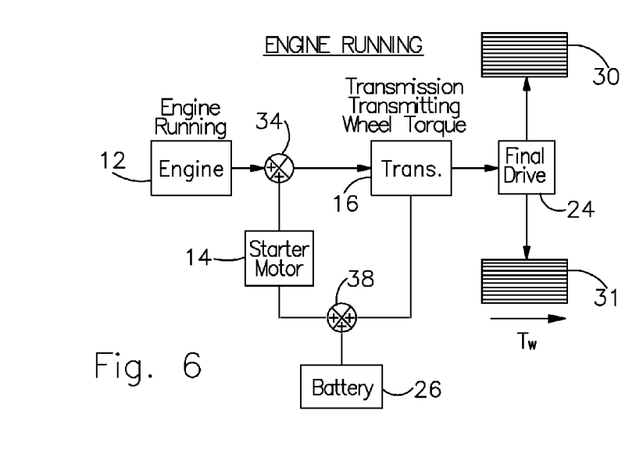
FIG. 6 is a schematic diagram showing power flow in the engine running operating mode.

Once engine 16 is restarted and running, the vehicle system controller 50 changes to the fourth operating mode illustrated in FIG. 6, wherein transmission 16 transmits the engine torque to the wheels 30, 31. The transmission 16 may be fully engaged in this operating mode.

Figure 7A:
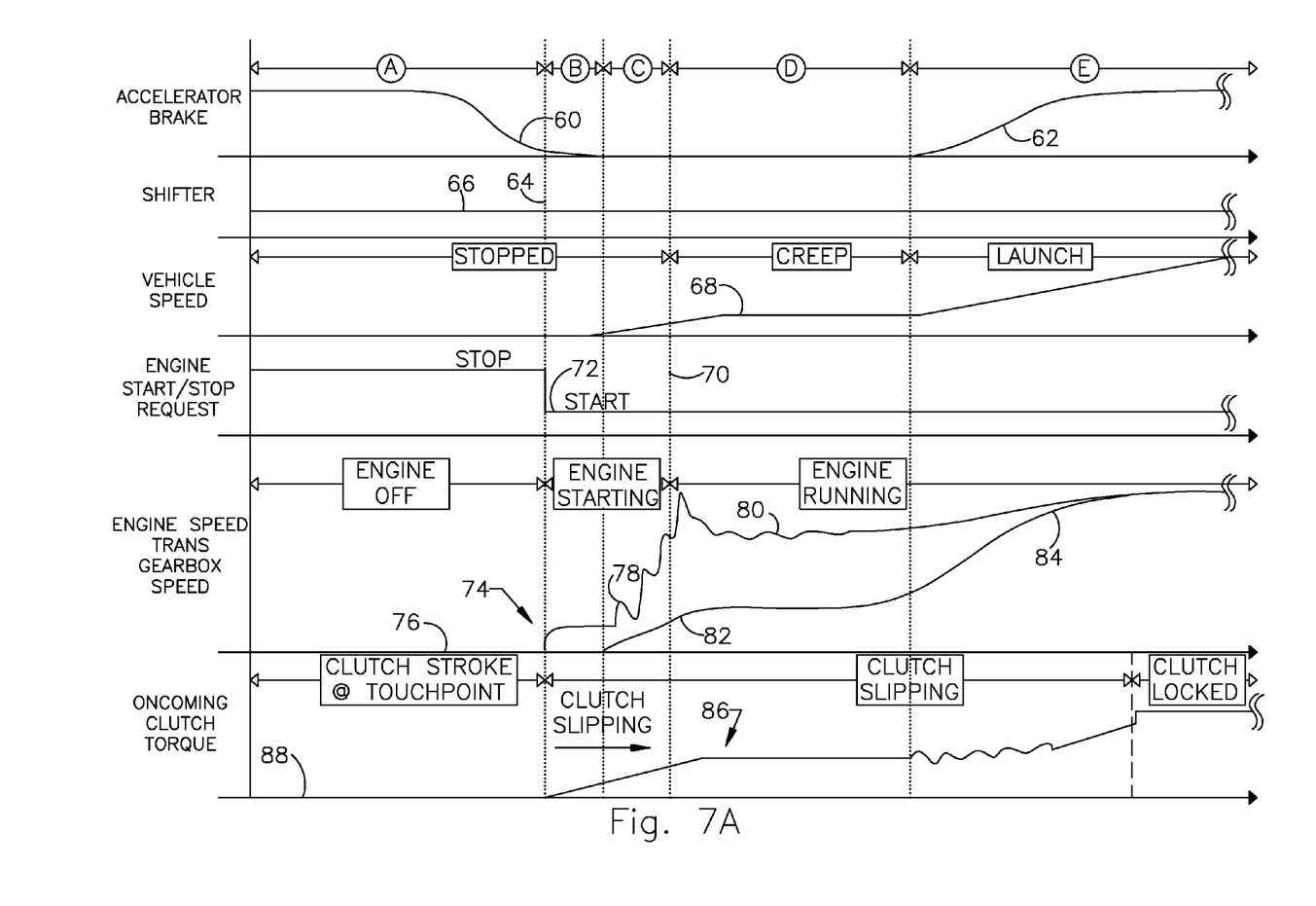
FIG. 7 is a series of graphs illustrating change in powertrain variables during an engine restart event.
Figure 7B:
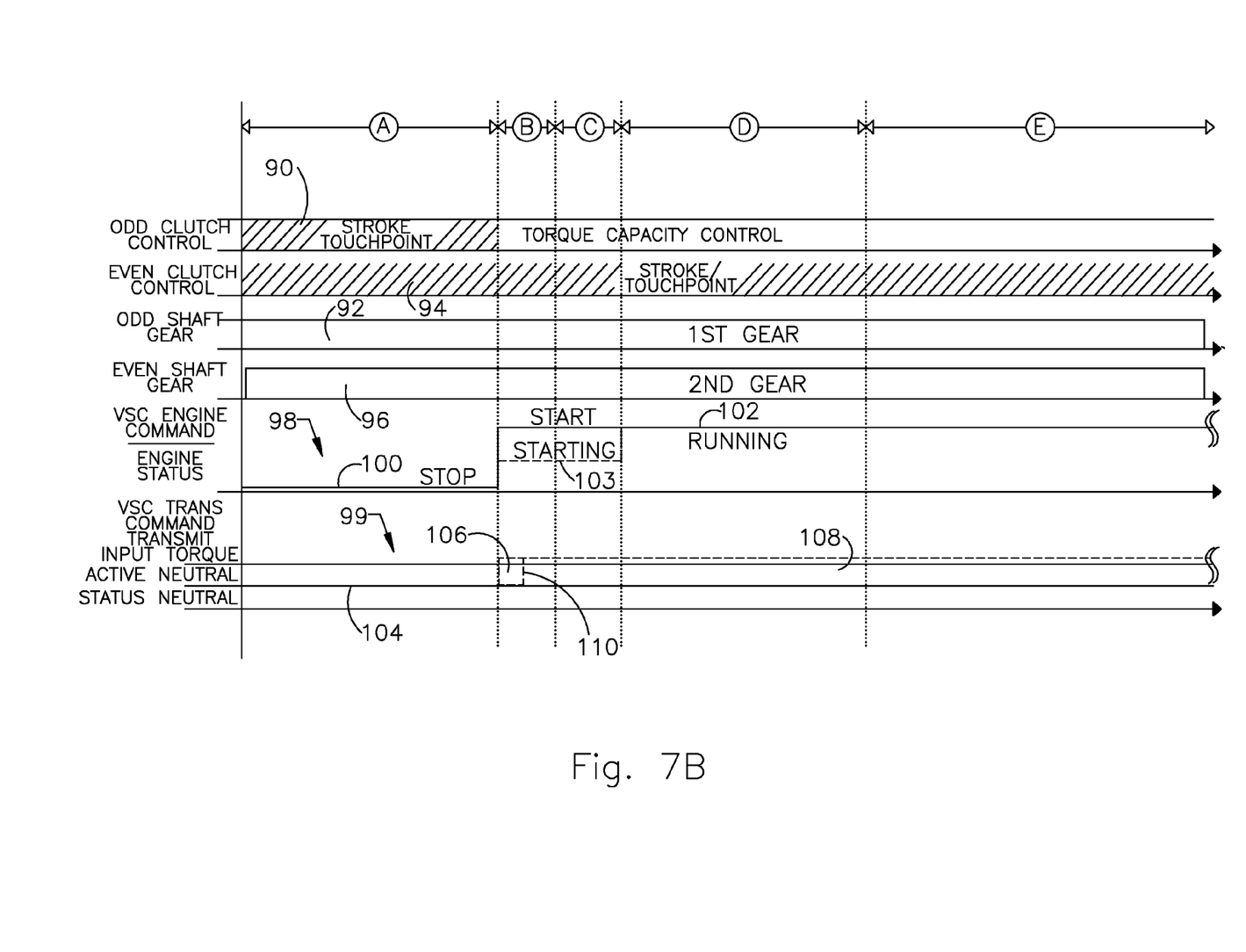

FIG. 7 contains graphs showing the change of certain powertrain variables during while the engine is shutdown followed by an automatic engine restart.

Graphs 60, 62 represent, respectively, release of the brake pedal 54 application of accelerator pedal 52, which are required to launch the vehicle. The engine restart is initiated at 64 when the brake pedal 54 returns substantially to its released state. The engine restart may also be initiated earlier before the brake pedal is fully released.

Graph 66 shows that the gear shifter 44 remains in its (D)RIVE position while engine 12 is stopped and after it restarts.

Graph 68, which represents vehicle speed, shows the vehicle beginning to creep 70 as the torque capacity of the oncoming clutch 18, 20 increases during the engine restart initiated at 64.

Graph 72 represents an engine stop request, followed by an automatically produced engine start request at 64, which is initiated by release of the brake pedal 54.

Graph 74, which represents engine speed, shows zero engine speed at 76 while the engine is stopped followed by an increase beginning at the engine restart 64 while starter 14 cranks engine 12. Engine speed 74 continues a rapid, irregular increase after the first engine combustion occurs at 78 and remains relatively steady during the period 80, while engine combustion is sustained and the engine idles.

Graph 82 shows the output speed (i.e. layshafts 36, 37) of the oncoming clutch 18, 20 increasing as the oncoming clutch gains torque capacity, remains steady for a period thereafter while slip across the clutch occurs, followed by locking the clutch at 84, whereupon clutch slip is reduced to zero.

Graph 86 the variation of torque transmitted by the oncoming clutch 18, 20 in response to its electro-mechanical actuation. Clutch torque is zero during a period 88, while the clutch is stroked at touchpoint, i.e., its torque capacity is zero and clearances among components of the clutch and its actuation system are reduced to substantially zero, thereby preparing the clutch immediately to increase its torque capacity when the clutch is so activated. If the vehicle launch begins in first gear, clutch 18 is stroked at the touchpoint position at 90 during period A, its torque capacity is controlled during periods B, C, D and E, and transmission 16 connects input 17 to output 22 through the first gear at 92 while the engine is stopped, restarted and running. Clutch 20 remains stroked at the touchpoint position at 94 during periods A-E, and transmission 16 is prepared for an upshift to an even-numbered gear, preferably by preselecting and engaging second gear on layshaft 37 at 96.

Graph 98 represents a period during which an engine stop command is present 100 and a period when the stop command is terminated and an engine start command occurs 102. Engine 12 is in starting mode 103 after the restart is initiated at 64 until sustained engine combustion occurs at 80 and running mode thereafter.

Referring to graph 99, before the restart is initiated at 64, transmission 16 is in the preparation operating mode 104 in an "active neutral" state, in which the clutches 18, 20 are stroked at the touchpoint position and the launch gear is engaged and the upshift gear is also engaged. Immediately upon the restart being initiated at 64 and for a period 108 thereafter, the transmission is commanded to transmit engine torque. During the period 108, which begins at 106 while engine 12 is being cranked, at 110 the transmission 16 transmits engine torque to the output 22 in the launch gear, preferably first gear.

Figure 8:
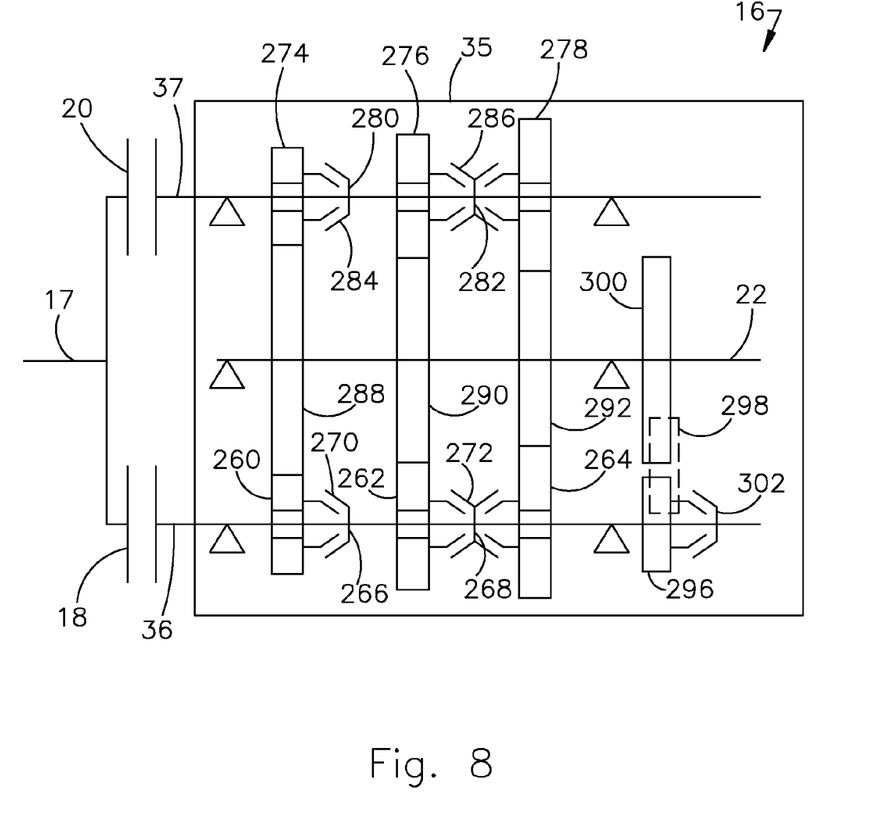
FIG. 8 is a schematic diagram showing kinematic details of a dual input clutch powershift transmission.

FIG. 8 illustrates details of a dual input clutch, powershift transmission 16, which includes the first input clutch 18, which selective connects the input 17 of the transmission alternately to the first layshaft 36 associated with odd-numbered forward gears and reverse gear 298, and a second input clutch 20, which selective connects the input 17 alternately to the even-numbered gears.

Layshaft 36 supports pinions 260, 262, 264, which are each journalled on shaft 36, and couplers 266, 268, 302 which are secured to shaft 36. Pinions 260, 262, 264 are associated respectively with the first, third and fifth gears. Coupler 266 includes a sleeve 270, which can be moved leftward to engage pinion 260 and driveably connect pinion 260 to shaft 36. Coupler 268 includes a sleeve 272, which can be moved leftward to engage pinion 262 and driveably connect pinion 262 to shaft 36 and can be moved rightward to engage pinion 264 and driveably connect pinion 264 to shaft 36.

Layshaft 37 supports pinions 274, 276, 278, which are each journalled on shaft 37, and couplers 280, 282, which are secured to shaft 37. Pinions 274, 276, 278 are associated respectively with the second, fourth and sixth gears. Coupler 280 includes a sleeve 284, which can be moved leftward to engage pinion 274 and driveably connect pinion 274 to shaft 37. Coupler 282 includes a sleeve 286, which can be moved leftward to engage pinion 276 and driveably connect pinion 276 to shaft 37 and can be moved rightward to engage pinion 278 and driveably connect pinion 278 to shaft 37.

Transmission output 22 supports gears 288, 290, 292, which are each secured to output shaft 22. Gear 288 meshes with pinions 260 and 274. Gear 290 meshes with pinions 262 and 276. Gear 292 meshes with pinions 264 and 278.

A reverse pinion 296, journalled on layshaft 36, meshes with an idler 298, which meshes with a reverse gear 300 secured to output shaft 22. A coupler 302 selectively connects reverse pinion 296 to layshaft 36.

Couplers 266, 268, 280, 282 and 302 may be synchronizers, or dog clutches or a combination of these.

During an engine restart following D-R movement of gear selector 44, clutch 18 is initially the offgoing clutch as first gear is disengaged and is also the oncoming clutch after reverse gear has been engaged since both first and reverse gears can be driveably connected on the same layshaft 36. During an engine restart following R-D movement of gear selector 44, clutch 18 is initially the offgoing clutch as reverse gear is disengaged and is also the oncoming clutch after first gear has been engaged since both first and reverse gears can be driveably connected on the same layshaft 36.

In accordance with the provisions of the patent statutes, the preferred embodiment has been described. However, it should be noted that the alternate embodiments can be practiced otherwise than as specifically illustrated and described.

The invention claimed is:

1. A method for controlling an engine restart in a hybrid electric powertrain, comprising the steps of:
   (a) stopping the engine;
   (b) using an electric power source and an electro-mechanical actuator connected to the source to engage a gear and stroke a dry clutch of a dual-clutch transmission to zero torque capacity;
   (c) initiating an automatic engine restart;
   (d) increasing the torque capacity of the clutch to a desired torque capacity.

2. The method of claim 1 further comprising discontinuing use of the electro-mechanical actuator.

3. The method of claim 1 wherein step (c) is performed in response to releasing a brake pedal.

4. The method of claim 1 wherein step (c) is performed in response to depressing an accelerator pedal.

5. The method of claim 1 wherein step (b) is performed further comprises:
   using the electric power source and the electro-mechanical actuator to engage a second gear and stroke a second clutch of the transmission to zero torque capacity.

6. The method of claim 1 wherein step (d) further comprises increasing the torque capacity of the clutch while cranking the engine.

7. The method of claim 1 wherein step (d) further comprise slipping the clutch while cranking the engine.

8. A method for controlling an engine restart in a hybrid electric powertrain, comprising the steps of:
   (a) automatically stopping the engine;

(b) using an electric power source and an electro-mechanical actuator connected to the source to engage a launch gear and a next gear and to stroke to zero torque capacity first and second clutches of a dry-clutch transmission;
(c) initiating an automatic engine restart;
(d) increasing the torque capacity of the first clutch to a desired torque capacity.

9. The method of claim 8 further comprising discontinuing use of the electro-mechanical actuator.

10. The method of claim 8 wherein step (c) is performed in response to releasing a brake pedal.

11. The method of claim 8 wherein step (c) is performed in response to depressing an accelerator pedal.

12. The method of claim 8 wherein step (c) further comprises one of releasing a brake pedal and depressing an accelerator pedal.

13. The method of claim 8 wherein step (d) further comprises increasing the torque capacity of the clutch while cranking the engine.

14. The method of claim 8 wherein step (d) further comprising slipping the clutch while cranking the engine.

15. A hybrid electric powertrain, comprising:
an engine;
a dry dual-clutch transmission including two clutches and first and second gears;
an electro-mechanical actuator for actuating the clutches and engaging the gears; and
a controller configured to stop the engine, engage a gear and stroke the first clutch to zero torque capacity using the electro-mechanical actuator, initiate an automatic engine restart, and increase the torque capacity of the clutch to a desired torque capacity.

16. The powertrain of claim 15 further comprising:
a brake pedal;
a starter motor;
a source of electric power; and
wherein the controller is further configured to use the electric power source and starter motor to restart the engine in response to a release of the brake pedal.

17. The powertrain of claim 15 further comprising:
an accelerator pedal; and
wherein the controller is further configured to restart the engine in response to depressing the accelerator pedal.

18. The powertrain of claim 15 wherein the controller is further configured to increase the torque capacity of the clutch while cranking the engine and before sustained engine combustion occurs.

* * * * *